No. 609,439. Patented Aug. 23, 1898.
A. A. KLAR.
AUTOMATIC CUT-OFF AND STRAINER FOR CISTERNS.
(Application filed July 17, 1897.)
(No Model.) 2 Sheets—Sheet 1.
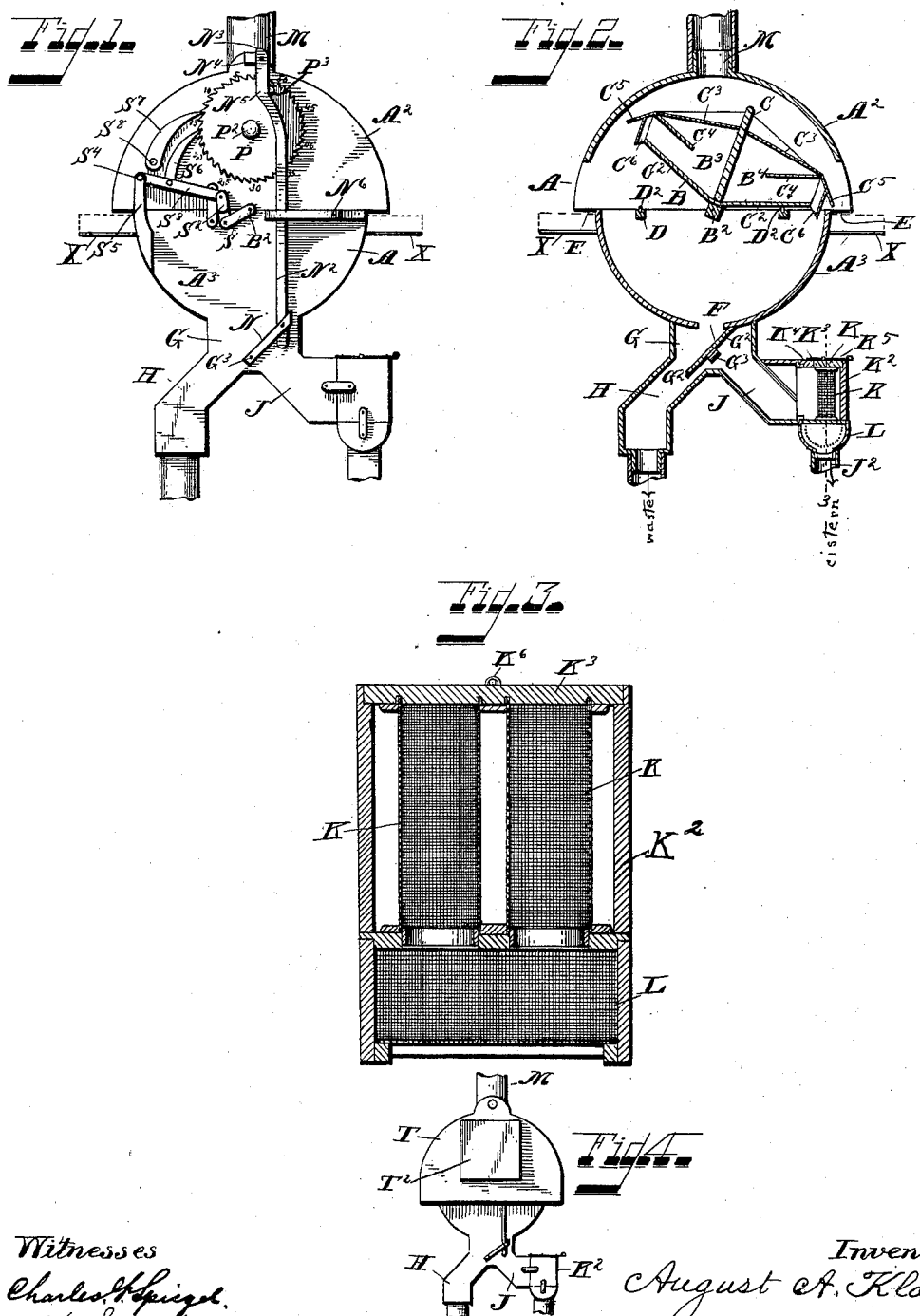

No. 609,439. Patented Aug. 23, 1898.
A. A. KLAR.
AUTOMATIC CUT-OFF AND STRAINER FOR CISTERNS.
(Application filed July 17, 1897.)
(No Model.) 2 Sheets—Sheet 2.
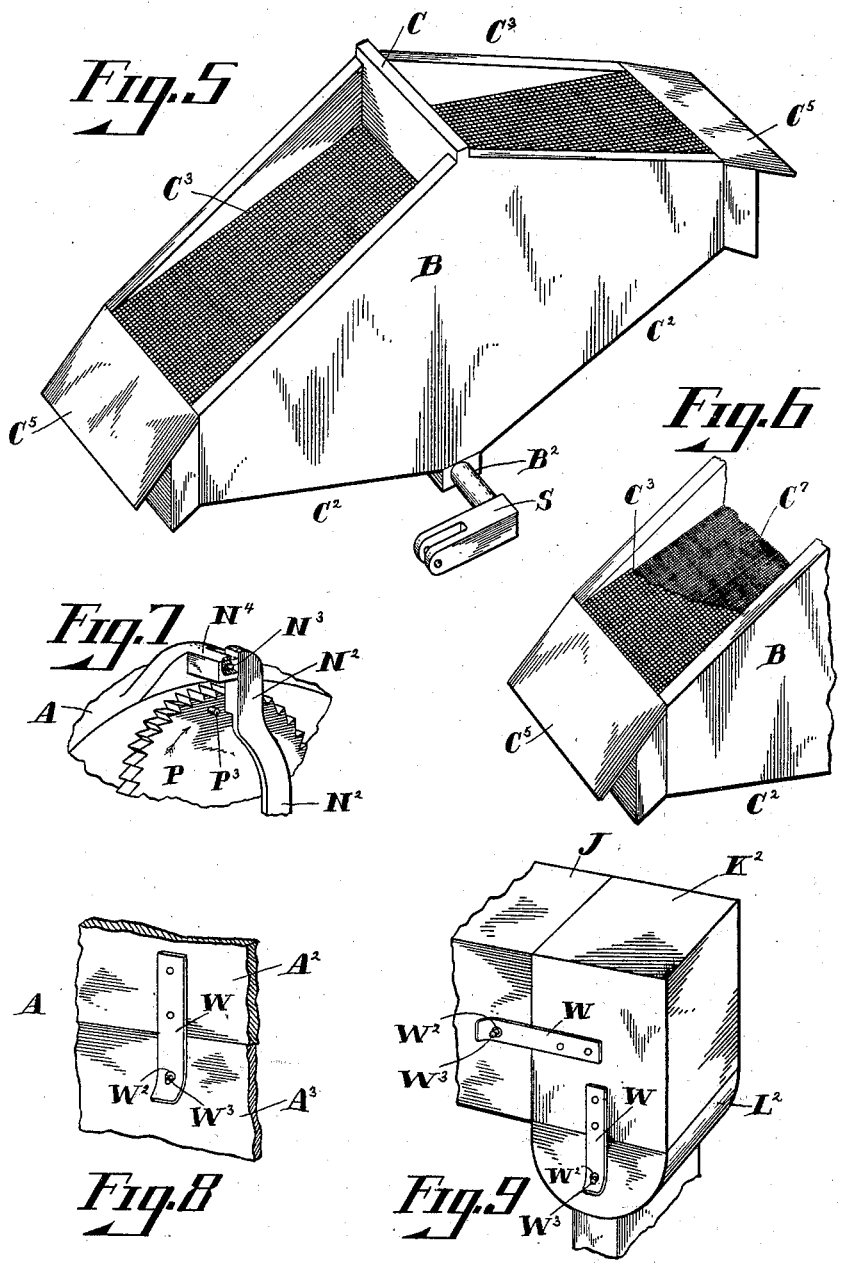
WITNESSES
A. S. Ludlow
N. Smith
INVENTOR
A. A. Klar,
per Wm. Hubbell Fisher
Atty.

UNITED STATES PATENT OFFICE.

AUGUST A. KLAR, OF CINCINNATI, OHIO.

AUTOMATIC CUT-OFF AND STRAINER FOR CISTERNS.

SPECIFICATION forming part of Letters Patent No. 609,439, dated August 23, 1898.

Application filed July 17, 1897. Serial No. 644,890. (No model.)

*To all whom it may concern:*

Be it known that I, AUGUST A. KLAR, a citizen of the United States, and a resident of the city of Cincinnati, in the county of Hamilton and State of Ohio, have invented certain new and useful Improvements in Automatic Cut-Offs and Water-Strainers for Cisterns, &c., of which the following is a specification.

The several features of my invention and the various advantages resulting from their use, conjointly or otherwise, will be apparent from the following description and claims.

In the accompanying drawings, making a part of this specification, and in which similar letters of reference indicate corresponding parts, Figure 1 is an elevation of the front side of a machine embodying my invention. Fig. 2 is a central vertical section from edge to edge of the machine. Fig. 3 is an enlarged view of certain of the straining devices, the view being a section taken in the plane of the dotted line 3 3 of Fig. 2 and that face of the section being seen which faces toward the right in Fig. 2. Fig. 4 is a front elevation of the machine. Fig. 5, Sheet 2, is an enlarged view in perspective of the oscillating receptacle and its accompaniments. Fig. 6 is a view in perspective of one of the receptacles, taken on the same scale as Fig. 5 and illustrating the preferred mode of employing an automatic screen of finer mesh in connection with a coarser screen shown in Figs. 5 and 6. Fig. 7 is an enlarged view in perspective of the upper portion of the rod employed as a part of the mechanism for changing the direction of the flow of water in this automatic cut-off and water-strainer and also showing the preferred connection between said rod and the casing and also showing a portion of the operating ratchet-wheel and its projecting pin. Fig. 8 is an enlarged view in perspective of the preferred means for uniting the upper and lower portions of the casing. Fig. 9 is an enlarged view in perspective of the preferred means for connecting together the tube-sections hereinafter described.

A indicates the exterior casing, preferably of a form generally cylindrical, as shown. To secure ease and economy of construction and to enable certain of the working parts to be readily reached, the casing is made so that the upper portion $A^2$ can be readily removed from the lower portion $A^3$ of the casing A. Within this casing is a receptacle B, oscillatory on a pivotal connection $B^2$, supported by the casing. This receptacle is subdivided into two equilateral compartments $B^3$ and $B^4$. The bottom $C^2$ and top $C^3$ of the compartments approach the mid-division C at an angle. Each compartment from where it meets the mid-division tapers off toward its outer end for the purpose of the better performing its functions hereinafter mentioned. The bottoms $C^2$ of each compartment are imperforate. The tops $C^3$ of the compartments are respectively of screen or netting work of a somewhat coarse mesh. At the outer end of each screen $C^3$ is a chute board or plate $C^5$, inclining downward at a greater angle than the screen itself.

Within each compartment and extending from the front upper edge backward a part of the distance to the central division C is a diaphragm or guard-plate $C^4$. From the upper part of the outer end of the compartment, preferably from plate $C^5$, depends a deflecting-plate $C^6$, extending outward and downward.

The outer lower part of the end of each compartment is open. Two suitable detents or stops D, respectively located on opposite sides of the pivot $B^2$, operate to prevent this oscillatory receptacle from falling too far on either side of the pivot.

In the vicinity of the place where the outer end or delivery of the compartment is located when it has descended as far as it can is an opening E in the casing, leading outside of the lower portion of the casing A to enable the oscillating screen to dump the coarse stuff screened from the water outside of the receptacle. The delivery-mouth of this compartment is in direct communication with the interior of the lower part $A^3$ of the casing A.

At the lower part or bottom of the casing $A^3$ is a delivery-opening F, conducting into a chamber G, which has two branch delivery-conduits—viz., H and J. Conduit H leads into the waste drain or outlet and conduit J leads in the direction of the rain-water cistern.

In the chamber G is a suitable two-way valve, one form of which is shown and consists of a plate $G^2$, operated on and by a midlength shaft $G^3$. When this valve is turned as shown in Fig. 2, the water coming from casing or receptacle $A^3$ through opening F is deflected into waste-outlet H; but when the valve is turned in the contrary direction the water from opening F is conducted by this valve into the cistern-conduit J.

For a more thorough straining of the water conducted through conduit J to the cistern I locate somewhere in conduit J, or between it and the cistern-pipe, screens, preferably as follows: I provide two fine-mesh upright cylindrical screens K—two is the preferred number—and locate them on a support imperforate except within the area of the lower ends of these screens. The water coming through conduit J must pass through these screens and thence through their lower ends on its way to the cistern. The bottom of the receptacle below these screens K is preferably a screen L and of a semicylindrical or bracket form, as shown, located in a suitable casing $L^2$. Its mesh should be finer than that of the screens K. The water from the latter screens will next come upon the screen L, and, passing through this, will run into the pipe $J^2$ to the cistern.

In the top of the upper casing $A^2$, in vertical line with the line of the shaft or pivot $B^2$, is the inlet-pipe M, through which water from the roof or like part comes and enters this casing $A^2$. The mid-partition C extends for a distance above the screenwork $C^3$.

The mode in which those portions of my invention thus far described operate is as follows: The valve $G^2 G^3$ is first located as shown in Fig. 2. When a rainfall occurs, the water falls from pipe M down upon the screen $C^3$ of compartment $B^3$ and flows through this screen and down into this compartment. All coarse articles—sticks, stones, tar-paper, scales of paint, or other coarse matter collected on the roof—are stopped by this screen. After this compartment has become full of water its weight causes it to descend, and the water is discharged through the open deflecting-mouth of the compartment into the lower casing $A^2$, whence it runs down through opening F by valve $G^2 G^3$ into pipe H and thence into the waste. The diaphragm $C^4$ assists in preventing the water in the compartment from splashing up and out of the screen as this compartment descends. All of the debris caught by screen $C^3$ is dumped out through adjacent opening E of the casing. The compartment $B^4$ is now receiving water in the same manner as did compartment $B^3$ and its screen acting in a similar manner, and when this compartment is full of water it descends, discharging its water into the casing $A^3$ and through the waste H and the debris on its screen through adjacent opening E. Such action is thus continued until the first or dirty run of water from the roof has ceased, and then the position of the valve $G^2 G^3$ is reversed, and then the water received into the lower casing $A^3$ from the oscillating double compartment $B^3 B^4$ passes through opening F, by valve $G^2 G^3$, to the cistern-conduit J and through the fine-mesh screens K K and L, and thence into the cistern. These latter screens catch the greater part of all finer objectionable foreign bodies brought in the water from the roof and cause the water entering the cistern to be quite pure and clear and desirable.

To render my mechanism the more convenient and certain in operation in the absence of any attendant, I provide it with novel devices for automatically operating the valve after a desired amount of water has been discharged into the waste, to wit: The shaft $G^3$ of the valve is exterior to the casing provided with a crank N, whose opposite end is pivotally connected to a rod $N^2$. The rod $N^2$ has a pin $N^3$, adapted to fit into a recess in a support $N^4$ at the top part of the casing. When the rod $N^2$ is thus connected to the support, the free end of the crank N is elevated and the valve $G^2$ occupies the position shown in Fig. 2. A ratchet-wheel P is mounted on a pivot $P^2$ at the side of the casing. This wheel carries a side projection or stud $P^3$. As the ratchet-wheel P revolves the stud $P^3$ is in its lower arc free to pass behind the rod $N^2$, the latter being there hollowed out or bent to allow the stud to pass it without interference. As the stud reaches the point $N^4$ of the rod $N^2$ (for the wheel travels over from left to right) it strikes the rod $N^2$ and presses the latter back and disconnects it from the support $N^4$. The rod then drops and moves down the crank N and reverses the valve $G^2 G^3$, so that the latter carries the water to the cistern, as aforementioned. A loop-guard $N^6$ on the casing prevents the rod from falling much out of the perpendicular and holds it in readiness for a new use. Connected to the shaft $B^2$ of the oscillatory receptacle is a crank S, whose free end is pivotally connected to the end of a link or rod $S^2$. The other end of the latter is in turn connected to the free end of a lever $S^3$, whose other end is pivoted to the casing, preferably at $S^4$, to an arm $S^5$ of the lower casing. This lever $S^3$ is pivotally connected to the lower end of a pawl $S^6$, adapted to engage and operate the ratchet-wheel P by engaging the teeth of the latter in the well-known manner. Another pawl $S^7$ is present, pivoted at $S^8$ at its lower end to the casing, and engages the ratchet-wheel and prevents retrocession of the wheel while the pawl $S^6$ is drawn back to engage a fresh tooth of the wheel.

As arranged each tooth of the ratchet-wheel P represents the dumping of two compartments—viz., $B^3$ and $B^4$—of water. One time these combined compartments oscillate the pawl $S^6$ is drawn down and engages a new tooth, and then the next time the combined compartments oscillate they move the pawl $S^6$ up and move the wheel P one tooth forward. Graduations will usually be marked on the casing just outside of the periphery of the wheel, as indicated in Fig. 1. The farther away in point of revolution the stud $P^3$ is set the more oscillations of the oscillatory receptacle will be required before the valve shuts the waste-pipe H and conducts the water into the cistern-pipe J. In Fig. 1 the stud is placed so that the wheel P must revolve nearly an entire revolution before the water is conducted into the cistern-pipe. This position of the wheel P and stud $P^3$ compels the oscillating compartment to oscillate one hundred times and dump this amount of water into the waste before the water from the roof is turned into the cistern. Locating the stud $P^3$ opposite "45" compels the dumping of ninety compartments of water before the water enters the cistern, and so on. After the stud has been set at a given number and the rod hung up in position to be operated upon (see Fig. 1) no further attention need be paid to the mechanism.

When a rainfall occurs, the apparatus will dump the water into the waste-pipe for the number of times the machine has been set to do this, and then the stud $P^3$, having arrived at the point $N^5$ of the rod $N^2$, strikes it and disengages its pin or like connection from the support $N^5$ and reverses the valve, and thereafter all of the water flows into the cistern.

It will be observed that my apparatus is very useful in clearing the water whether it go into the waste or cistern, thereby preventing clogging of pipes or drains, and is further very useful in automatically dumping the first water into the waste to a desired amount and then dumping the rest of the water into the cistern.

Subordinate details of construction are as follows: The upper casing $A^2$ is arranged to lift off from the lower casing $A^3$ to enable the oscillatory receptacle to be inspected and cleaned. The compartment or tube-section containing the screens K is separable from the adjoining sections, and the compartment or tube-section having screen L is also separable from its adjoining tube portions.

The preferred means of connecting together the parts $A^2$ and $A^3$ of the casing A and the tube-sections J to their adjoining parts is preferably a flat elastic strip W, fastened to one section or part to be joined and having in its free end a hole $W^2$, which receives a knob or stud $W^3$ on the opposite section. The elasticity of the strip keeps it in engagement with the knob until moved by human agency. Such a strip and knob are old and well known and no further mention thereof need be given.

For the purpose of readily inspecting the screens K and removing foreign matter from them I provide a separable door or lid $K^3$ in the top of the chamber or tube-section $K^2$ in which the screens are located. This lid is suitably secured, as by the staple $K^4$ of the lid, and a rod $K^5$ passed through this staple and through a staple $K^6$ of the chamber.

For the better protection of the devices for automatically opening the valve against being meddled with by children or any one not entitled to set the devices I provide the same with an enveloping casing T, arranged to fit on and be secured to the other casings $A^2$ and $A^3$. A door $T^2$ in this protective casing, when open, allows access to the setting devices. When the door is closed, it can be locked and then no interference with these devices can take place.

When desired, an extra screen $C^7$ of finer mesh than screen $C^3$ may be present in each of the compartments $B^2$ and $B^3$, as indicated in Fig. 6.

For easing the heavy fall of the oscillatory receptacle I provide the stops D with roller-cushions $D^2$.

A shelf X may be located under each orifice E to receive the dirt, &c., caught and delivered from the upper screens.

What I claim as new and of my invention, and desire to secure by Letters Patent, is—

1. In a water-purifier, the combination of the oscillatory dumping-receptacles having screens, casing, openings E for the discharge of the debris from the screens, and the opening F in the casing, and chamber G in communication with the two conduits H and J, and the valve in chamber G for directing the flow of water into one or the other of these conduits, substantially as and for the purposes specified.

2. In a water-purifier, the combination of the oscillatory dumping-receptacles having screens, casing, openings E for the discharge of the debris from the screens, and the opening F in the casing, and chamber G in communication with the two conduits H and J, and the valve in chamber G for directing the flow of water into one or the other of these conduits, and the screen of finer mesh in the tube J, substantially as and for the purposes specified.

3. In a water-purifier, the combination of a water-compartment and screen above, and the tube J for receiving the water, and the tube-section or chamber $K^2$ having the upright cylindrical screen or screens K, through which the water enters, and the openings in the bottom of the same, through which the water passes in, substantially as and for the purposes specified.

4. In a water-purifier, the combination of a water-compartment and screen above, and the tube J for receiving the water, and the tube-section or chamber $K^2$ having the upright cylindrical screen or screens K, through which the water enters, and the openings in the bottom of the same, through which the water passes in, and the supplemental curved screen L below the cylinders K, and receiving the water from them, substantially as and for the purposes specified.

5. In a water-purifier, the combination of a water-compartment and screen above, and the tube J for receiving the water, and the tube-section or chamber $K^2$ having the upright cylindrical screen or screens K, through which the water enters, and the openings in the bottom of the same, through which the water passes in, and the supplemental curved screen L below the cylinders K, and receiving the water from them, the tube-section K² being separable from the tube J, and from the succeeding section, substantially as and for the purposes specified.

6. In a water-purifier, the combination of a water-compartment and screen above, and the tube J for receiving the water, and the tube-section or chamber K² having the upright cylindrical screen or screens K, through which the water enters, and the openings in bottom of the same, through which the water passes in, and the supplemental curved screen L below the cylinders K, and receiving the water from them, the tube-section K² being separable from the tube J, and from the succeeding section, and provided above with the separable door, or lid, substantially as and for the purposes specified.

7. The combination of the oscillatory receptacle having a pivot B², and central division-wall C, and top screens over each compartment, and end delivery-orifices, and interior screens C⁴, from the upper part of the end part way inward, and the casings having openings E for the discharge of the debris from the screens, substantially as and for the purposes specified.

8. The combination of the oscillatory receptacle having a pivot B², and central division-wall C, and top screens over each compartment, and end delivery-orifices, and interior screens C⁴, from the upper part of the end part way inward, and exterior fenders C⁵ over the mouths of the delivery-orifices, and the casings having guide-openings E adapted to receive and discharge the debris from the screens, substantially as and for the purposes specified.

9. In a device for purifying water and delivering it, the combination of the casings having the end openings E, and the lower opening F, and an oscillatory receptacle having two compartments, separated by a division C and topped by screens C³, having end delivery-orifices, the bottoms of the compartments inclining outward and upward, and the screens inclining outward and downward, when the receptacle is at the mid-point of oscillation, substantially as and for the purposes specified.

10. In a device for purifying water and delivering it, the combination of the casings having the end openings E, and the lower opening F, and an oscillatory receptacle having two compartments, separated by a division C and topped by screens C³, having end delivery-orifices, the bottoms of the compartments inclining outward and upward, and the screens inclining outward and downward, when the receptacle is at the mid-point of oscillation, and the interior screens C⁴, substantially as and for the purposes specified.

11. The combination of the oscillatory receptacle having two compartments, each having an upper screen, and one below the latter, and the casing, substantially as and for the purposes specified.

12. The combination of the casing having discharge-openings E, and the inlet-conduit M above, and the oscillatory receptacle beneath said conduit M, and the lower opening F of the casing and chamber G and the waste-conduit H and cistern-conduit J, and the valve in chamber G for controlling the direction of the water, and the lever N of the valve and rod N² thereof, and provided with device for suspending it to a support as N⁴, lever S of the pivot or shaft of the oscillating receptacle, and link S², lever S³ thereof, and pivoted, and pawl S⁶ pivoted thereto, and pawl S⁷, and ratchet-wheel P having stud P³, and engaging the said pawls, substantially as and for the purposes specified.

13. The combination of the casings, their openings, oscillatory screened compartments, on a pivot, and pawls, and ratchet-wheel, and the valve and branch conduits controlled by the valve, and means for enabling the revolution of the ratchet-wheel to operate the valve, and means for enabling the oscillation of the oscillatory receptacle to work the operating-pawl and ratchet-wheel, substantially as and for the purposes specified.

14. The combination of the casing, provided with its openings and the oscillatory receptacle, and the two-way valve, and means for enabling the oscillatory receptacle to throw the valve after a given number of oscillations, substantially as and for the purposes specified.

15. The combination of the casing, and the oscillatory receptacle, two-way valve, and the mechanism for enabling the latter to automatically throw the valve, after the receptacle has operated a given number of times, and a hood inclosing said mechanism, and provided with a door, substantially as and for the purposes specified.

AUGUST A. KLAR.

Attest:
 WM. E. JONES,
 K. SMITH.